Jan. 15, 1963 R. R. BIGLER ET AL 3,073,975

CRYSTAL UNIT

Filed Dec. 23, 1958

INVENTORS
ROBERT R. BIGLER AND
EDWARD M. WASHBURN
BY
Charles H. Brown
ATTORNEY

United States Patent Office 3,073,975
Patented Jan. 15, 1963

3,073,975
CRYSTAL UNIT

Robert R. Bigler, Erlton, and Edward M. Washburn, Pennsauken, N.J., assignors to Radio Corporation of America, a corporation of Delaware Filed Dec. 23, 1958, Ser. No. 782,583
9 Claims. (Cl. 310—9.2)

The present invention relates to crystal units and particularly to an improved crystal unit and to an improved process for fabricating such a unit.

An object of the invention is to provide a highly compact and structurally rigid quartz crystal unit suitable for micro-module applications and which can withstand severe environmental conditions of humidity, temperature, altitude, vibration and shock.

Another object is to provide a rugged quartz crystal assembly in which the quartz plate is so mounted in its supporting holder as to be mechanically secure, as distinguished from a loose fitting, yet permitted to vibrate freely in the preferred mode, without the need for being clamped or held by spring clips.

A further object is to provide an improved mounting for a quartz plate producing thickness shear vibrations so as to minimize undesired responses or spurious piezoelectric modes of vibration.

Briefly, the quartz crystal unit of the invention includes a hermetically sealed holder of insulation material made up of two or three parts in which the parts are permanently attached to each other. In one embodiment of the invention, the quartz plate is provided with electrodes in the form of electrically conductive coatings on opposite surfaces thereof and these coatings extend to spaced points on the edges of the plate. In one embodiment, the quartz plate is mounted on and soldered at its edges at these points to one part of the holder while in another embodiment of the invention the quartz plate is mounted on and soldered at its edges to metallic pins which pass through one wall of the holder. The holder is preferably made of a ceramic material because ceramic is easy to mold and control, and can be heated to temperatures high enough to remove any organic material which might contribute adversely to the aging of the crystal. The crystal unit is characterized by the absence of flexible leads in the interior of the holder.

In another embodiment of the invention, an unplated quartz plate is employed and the electrodes are plated or deposited on the inside faces of the upper and lower insulation parts of the hermetically sealed holder.

Among the advantages of the invention are: the construction of the crystal unit is such as to permit the fabrication and mounting of plated fundamental or overtone quartz plates within the smallest practical crystal holder suitable for micro-module applications. The maximum external dimensions of the unit may be made as small as .310" x .310" by .047" or so small that 222 of them occupy a volume of only 1 cubic inch. The assembly is structurally rigid and can withstand wide ranges of vibration without developing sympathetic undesired vibrations. Under shock, the quartz plate cannot move and strike the holder or cover and possibly shatter, as sometimes experienced by conventional crystal units. With a thickness shear quartz plate, the mechanical motion of the quartz is minimum at the extreme edges at which the plate is supported. The supports at these edges therefore have minimum effect on the electrical performance of the quartz plate. The crystal unit of the invention lends itself to economical mass production in the smallest unit ever produced thus far.

A more detailed description of the invention follows, in conjunction with a drawing, in which FIGURE 1 is a cross-section of a crystal unit constructed in accordance with one embodiment of the invention;

Throughout the figures of the drawing the same parts are represented by the same reference numerals.

Figures 1, 2, 3, 4, 5:
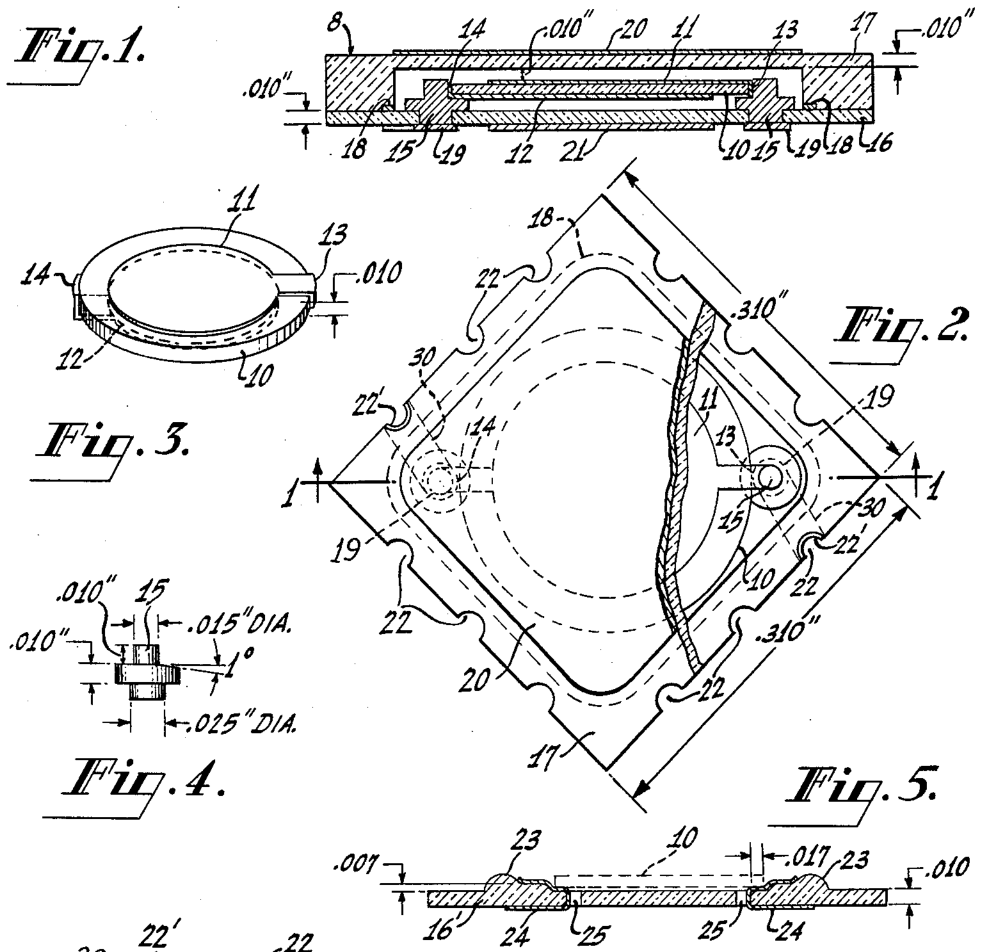
FIGURE 2 is a plan view of the crystal unit of FIGURE 1.
FIGURE 3 is a perspective view of a quartz crystal plate before it is assembled in the unit.
FIGURE 4 is a view of one of the pins which serves the dual purpose of a support for the quartz plate and a conductive path for the electrodes plated on the quartz.
FIGURE 5 shows an alternative design for the lower part of the crystal holder upon which the quartz plate is mounted.

The crystal unit or assembly of the invention includes a quartz crystal plate 10 on opposite surfaces of which are plated electrodes in the form of conductive coatings 11 and 12. These plated electrodes cover a relatively large surface area of the quartz plate and extend to points on the edges of the quartz plate which may be diametrically opposite, as shown. The electrically conductive coatings each extend over a small area at the edge, so that the coatings can be rigidly soldered at the edges to suitable supports for the crystal plate. The quartz plate can take other shapes and the plated electrodes can also take other shapes and vary in size relative to the overall size of the quartz plate.

In the preferred design illustrated, the holder comprises an upper part 8 and a lower part 16 which are hermetically sealed together, as by soldering, along a small metallized area 18 extending around the entire holder in a substantially circular or endless path. The lower part 16 of the holder accomodates a plurality of metal pins 15, shown in more detail in FIGURE 4, which are secured, as by soldering, in metal coated apertures of part 16 and provide shoulders in the interior of the holder for supporting the quartz plate 10.

The shoulder surface of pin 15 can be essentially flat or tapered slightly, 1 degree for example, in a downward direction, as shown in FIGURE 4, on that portion adapted to support the quartz. The pins are soldered at the shoulder to those points 13 and 14 on the edges of the quartz plate which are extensions of the electrically conductive plated electrodes 11 and 12.

The bottom portions of pins 15 are joined, as by soldering, to metallized surfaces 19 which extend by way of an electrical metalized coating or connection 30 to an appropriate notch 22 along the edge of the plate 16, thus providing electrically conductive paths from the electrodes 11 and 12 to the exterior of the crystal unit without the need for flexible leads within the unit. The notches 22 are metallized at 22' and contact wires, not shown, are soldered to these notches. Theoretically, with a thickness shear quartz plate, there is no motion along a plane located through the center thickness of the quartz plate. Hence at the lower frequencies it may be desirable to contour the quartz plate at one or both faces near the edges to permit better isolation of the support from the vibrating portion of the quartz plate. This is done by soldering the support pins to the quartz plate on a thinned-down edge corresponding to the theoretical foregoing center plane.

If desired, as shown in FIGURES 1 and 2, metallic coatings 20 and 21 can be provided on the exterior surfaces of the holder on both sides of the crystal unit for shielding purposes. Since the crystal unit of the invention is extremely small and adapted for micro-module applications in which the units may be stacked one above the other, it is often desirable to shield the units from the associated electrical circuitry to obtain maximum frequency stability, particularly in tight frequency control applications. The coatings 20 and 21, when connected to ground, serve to electrostatically shield the quartz plate from external associated circuitry. It should be noted that there are gaps of insulation between shield 21 and coating 19 to insure electrical insulation between the pins 15 and the shield coating.

Although only two pins 15 have been shown in FIGURES 1 and 2, it should be understood that three or more pins can be used to help locate the quartz plate accurately in position in the holder. A three-point mount can effectively reduce undesired responses or spurious piezo-electric modes of vibrations, by preferred locations of the supports which give the desired dampening effect.

In one crystal unit or assembly fabricated according to the showing of FIGURES 1 and 2, the maximum external dimensions of the unit were approximately .310" x .310" x .047" or so small that 222 of these units would occupy a volume of one cubic inch. The five basic dimensions in the thickness direction of the unit were each .010 inch approximately, as indicated in FIGURES 1 to 4. The solder employed was a tin-antimony or tin-lead-cadmium material having a high melting point of approximately 250° C. The ceramic material used for the holder was an aluminum oxide or high alumina known by the trade name Alsimag. The reasons that ceramic plates are preferred are that the ceramic is easier to mold and control than other materials and may be subjected to high temperatures such as are used in preparing fired contacts. At these high temperatures any organic material which might contribute adversely to the aging of the crystal unit is removed. Is assemblying the crystal unit of the invention, the quartz plate is especially treated to provide for low aging characteristics. The quartz plate and the interior of the holder are cleaned thoroughly and the quartz plate is heat-treated. One part of the holder, such as either the base or the top cover, can be provided with a small aperture through which the internal gases and moisture may be exhausted from within the quartz crystal unit after assembly, and this aperture can be sealed either with or without charging the interior of the unit with an inert dry gas, such as nitrogen. The aperture in this case should preferably be metalized, for example by plating with an electrically conducting material, so that the aperture can be sealed with solder.

It should be understood that the invention is independent of the manner in which the electrically conducting coatings are placed on the quartz plate or on the surfaces of the holder parts. These electrical coatings can, if desired, be deposited by any well known processes such as vacuum plating with silver (or gold) by evaporation, by chemical deposition, by applying a conductive paste and firing at high temperatures or by sputtering, a process involving high voltages.

The crystal unit may be used either as an active (dynamic) or as a passive unit and designed to operate anywhere in a frequency range of 7 megacycles (mc.), or lower, to 70 megacycles (mc.), or higher, by way of example. A dynamic unit would be as an oscillator while a passive unit might be as a filter. Where a thickness shear vibration is desired, and this is preferred in utilizing the crystal unit of the invention, the quartz plate may be an AT or BT-cut crystal, for example, operating either in a fundamental or overtone mode.

FIGURE 5 shows an alternative design for the bottom part of the holder. This alternative design eliminates the need for metallic pins as shown in FIGURE 1 and comprises a ceramic part 16' which is provided with raised portions or bumps 23 for supporting the crystal. These bumps 23, it should be noted, are provided with shoulders or seats. The crystal will assume the position indicated by the dash lines 10 and would be soldered at its edges to the plated electrically conductive coatings 24 on the shoulders or seats, which coatings extend out of the holder through small apertures 25. These apertures 25 should be sealed with solder after assembly of the unit.

Figure 7:
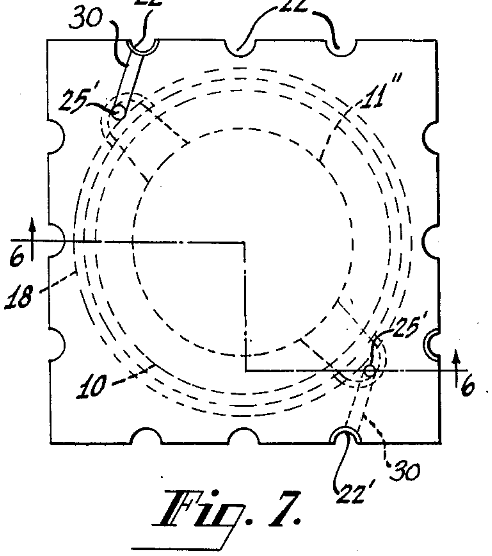
FIGURE 7 is a plan view of the crystal unit of FIGURE 6.
Figure 6:
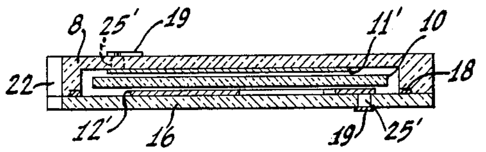
FIGURE 6 is a cross-section of another embodiment of a crystal unit constructed in accordance with the invention and taken along the lines 6—6 of FIGURE 7.

FIGURES 6 and 7 are a modification of the crystal unit of the invention and similar in most respects to that of FIGURES 1 and 2, except that the quartz plate 10 is unplated. The metalized electrodes for the crystal unit, identified as 11' and 12' are plated on the inside faces of insulator parts 8 and 16 of the hermetically sealed holder with metalized connections brought out to the outside through apertures which are sealed with solder after assembly of the parts. The upper electrode 11' is connected to the exterior surface of insulator holder part 8 by pin 25', while the lower electrode 12' is connected to the exterior surface of insulator holder part 16 by another pin 25'. The inside clearance between parts 8 and 16 would be .002"–.003" greater than the thickness of the quartz plate 10. The resulting crystal unit is of the spaced air gap type with no flexible internal leads. Since there is no mechanical restriction on the quartz plate the effective resistance will be low. Here again, as in the crystal unit of FIGURES 1 and 2, the metal coated surfaces 19 extend to different appropriate notches 22'—22 along the edges of parts 8 and 16. These notches are metalized and contact wires, not shown, are soldered to selected notches 22'.

Although the holder of the crystal unit has been illustrated and described as being made from two parts, it should be understood that, if desired, the holder can be made up of three parts hermetically sealed together; viz, top and bottom essentially flat parts spaced apart by a frame (ceramic or metal) in a design adaptable to hermetic sealing, without departing from the spirit and scope of the invention.

What is claimed is:

1. A hermetically sealed quartz crystal unit characterized by the complete absence of flexible leads in the interior thereof, comprising a holder having a flat base part and a cooperating hollow part sealed thereto, said parts being made of insulation material, a metallic deposit on the adjoining surfaces of both parts extending around the entire holder, said parts being fused together at said metallic deposit, metal coatings on interior surfaces of said holder on opposite sides of the quartz plate constituting electrodes for the quartz plate, metalized sealed apertures in said holder communicating with said electrodes, metal coatings on the exterior of said holder connected to said metalized apertures, said last-mentioned metal coatings being spaced from each other by insulation of said holder parts.

2. A hermetically sealed quartz crystal unit characterized by the complete absence of flexible leads in the interior thereof, comprising a holder having a flat base part and a cooperating hollow part sealed thereto, said parts being made of insulation material, a metallic deposit on the adjoining surfaces of both parts extending around the entire holder, said parts being fused together at said metallic deposit, metal coatings on facing interior surfaces of said holder on opposite sides of the quartz plate constituting electrodes for the quartz plate, metalized sealed apertures in said holder communicating with said electrodes, metal coatings on the exterior of said holder connected to said metalized apertures, said last-mentioned metal coatings being spaced from each other by insulation of said holder parts, said holder having spaced metalized notches at the edges thereof which extend through portions of the base part and the cooperating hollow part, and electrical connections from different ones of said metalized notches to different metal coatings on the exterior of said holder, whereby said notches are electrically connected to said electrodes.

3. A hermetically sealed quartz crystal unit characterized by the complete absence of flexible leads in the interior thereof, comprising a holder having a base part and a cooperating hollow part sealed thereto, said parts being made of insulation material, a metallic deposit on the adjoining surfaces of both parts extending around the entire holder, said parts being fused together at said metallic deposit, raised shoulders integral with said base part on the interior thereof and having metallic surfaces for supporting a quartz plate at its edges, a quartz plate having metal coatings on opposite faces thereof which constitute electrodes extending to and covering spaced points on the edges of the quartz plate, said metallic surfaces being soldered to the metal coatings at the edges of the quartz plate, rigid electrically conductive paths extending from said shoulders through said base part to the exterior of said base part, spaced metal coatings on the exterior surface of said base part for said electrically conductive paths, and metallic shields affixed to the exterior surfaces of one or both parts of said holder over areas substantially coextensive in size with said quartz plate, the metallic shield on the exterior surface of said base part being separated from said spaced metal coatings for said electrically conductive paths.

4. A quartz crystal unit comprising a base of insulation material forming part of a holder for said unit, a quartz plate having opposite surfaces coated with electrically conducting material to form electrodes for said quartz plate, said electrodes extending to spaced points on the edges of said plate so that said spaced points on said edges are coated with electrically conducting material to form conducting paths to said respective electrodes, rigid electrically conducting means passing through said base with the part of said conducting means on the interior of said base forming raised shoulders having step-like areas in the sides of said shoulders as seats for supporting said quartz plate a distance above the surface of said base, said rigid electrically conducting means being soldered to said coating of electrically conducting material at said areas, whereby said unit is characterized by the absence of flexible leads in the interior of said holder at said spaced points on said quartz plate, and said plate is mounted so as to be mechanically secure and yet permitted free vibratory motion in the preferred mode.

5. A hermetically sealed quartz crystal unit characterized by the complete absence of flexible leads in the interior thereof, comprising a holder having a base part and a cooperating hollow part sealed thereto, said parts being made of insulation material, a metallic deposit on the adjoining surfaces of both parts extending around the entire holder, said parts being fused together at said metallic deposit, raised shoulders integral with said base part on the interior thereof and having metallic step-like surface areas in the sides of said shoulders as seats for supporting a quartz plate at its edges, a quartz plate having metal coating on opposite faces thereof which constitute electrodes extending to and covering spaced points on the edges of the quartz plate, said metallic surface areas being soldered to the metal coatings at the edges of the quartz plate, rigid electrically conductive paths extending from said shoulders through said base part to the exterior of said base part, and spaced metal coatings on the exterior surface of said base part for said electrically conductive paths.

6. A quartz crystal unit as claimed in claim 5, in which said metallic surface areas are tapered downward in a direction toward the center of said crystal.

7. A quartz crystal unit as claimed in claim 5, in which said base part has spaced metalized notches along the edges thereof, and electrical connections between different ones of said notches and said metal coatings on the exterior surface of said base part.

8. A hermetically sealed quartz crystal unit characterized by the complete absence of flexible leads in the interior thereof, comprising a holder having a base part and a cooperating hollow part sealed thereto, said parts being made of insulation material, a metallic deposit on the adjoining surfaces of both parts extending around the entire holder, said parts being fused together at said metallic deposit, raised shoulders integral with said base part on the interior thereof and having metalized step-like surface areas in the sides of said shoulders as seats for supporting a quartz plate at its edges, a quartz plate having metal coatings on opposite faces thereof which constitute electrodes extending to and covering spaced points on the edges of the quartz plate, said metalized surface areas being soldered to the metal coatings at the edges of the quartz plate, rigid electrically conductive paths extending from said surface areas on said shoulders through said base part to the exterior of said base part, spaced metal coatings on the exterior surface of said base part for said electrically conductive paths, and metallic shields affixed to the exterior surfaces of one or both parts of said holder over areas substantially coextensive in size with said quartz plate, the metallic shield on the exterior surface of said base part being separated from said spaced metal coatings for said electrically conductive paths.

9. A quartz crystal unit as claimed in claim 8, in which said base part has spaced metalized notches along the edges thereof, said spaced metal coatings on the exterior surface of said base part completing electrical connections to different ones of said notches.

References Cited in the file of this patent

UNITED STATES PATENTS

| | | |
|---|---|---|
| 2,222,056 | William | Nov. 19, 1940 |
| 2,326,923 | Bokovay | Aug. 17, 1943 |
| 2,327,487 | Bach | Aug. 24, 1943 |
| 2,434,266 | Fruth et al. | Jan. 13, 1948 |
| 2,488,781 | Reeves | Nov. 22, 1949 |
| 2,508,720 | Kuenstler | May 23, 1950 |
| 2,771,561 | Fuller | Nov. 20, 1956 |
| 2,771,663 | Henry | Nov. 27, 1956 |
| 2,877,362 | Tibbetts | Mar. 10, 1959 |

FOREIGN PATENTS

| | | |
|---|---|---|
| 953,895 | France | May 30, 1949 |